May 9, 1939.                G. HOSSENFELDER                2,157,986
ARRANGEMENT FOR CONNECTING STRUCTURAL ELEMENTS
Filed May 13, 1936                2 Sheets-Sheet 1
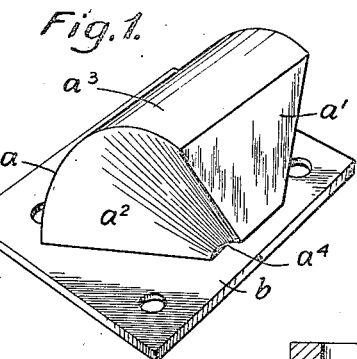
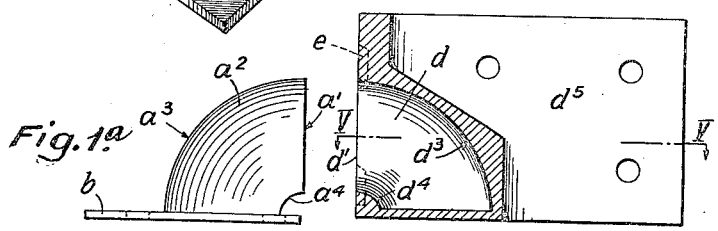
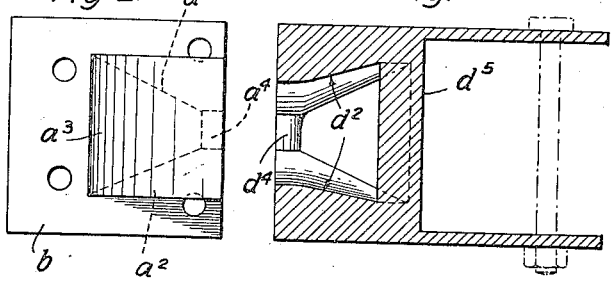
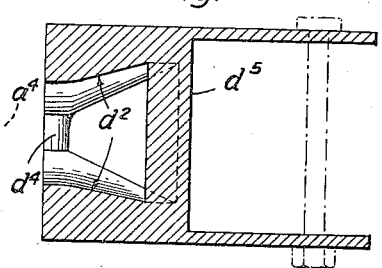
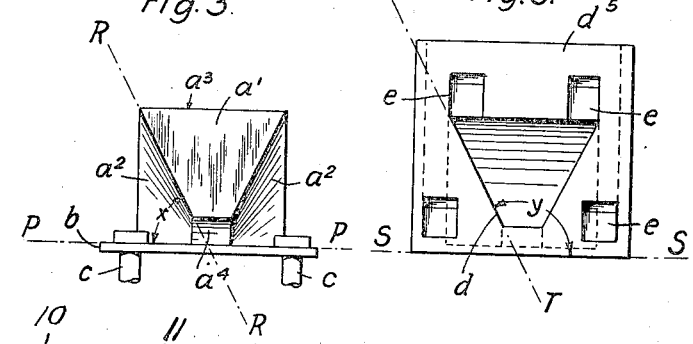
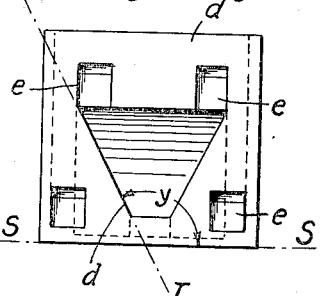
INVENTOR
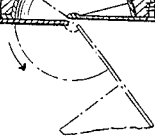
Georg Hossenfelder

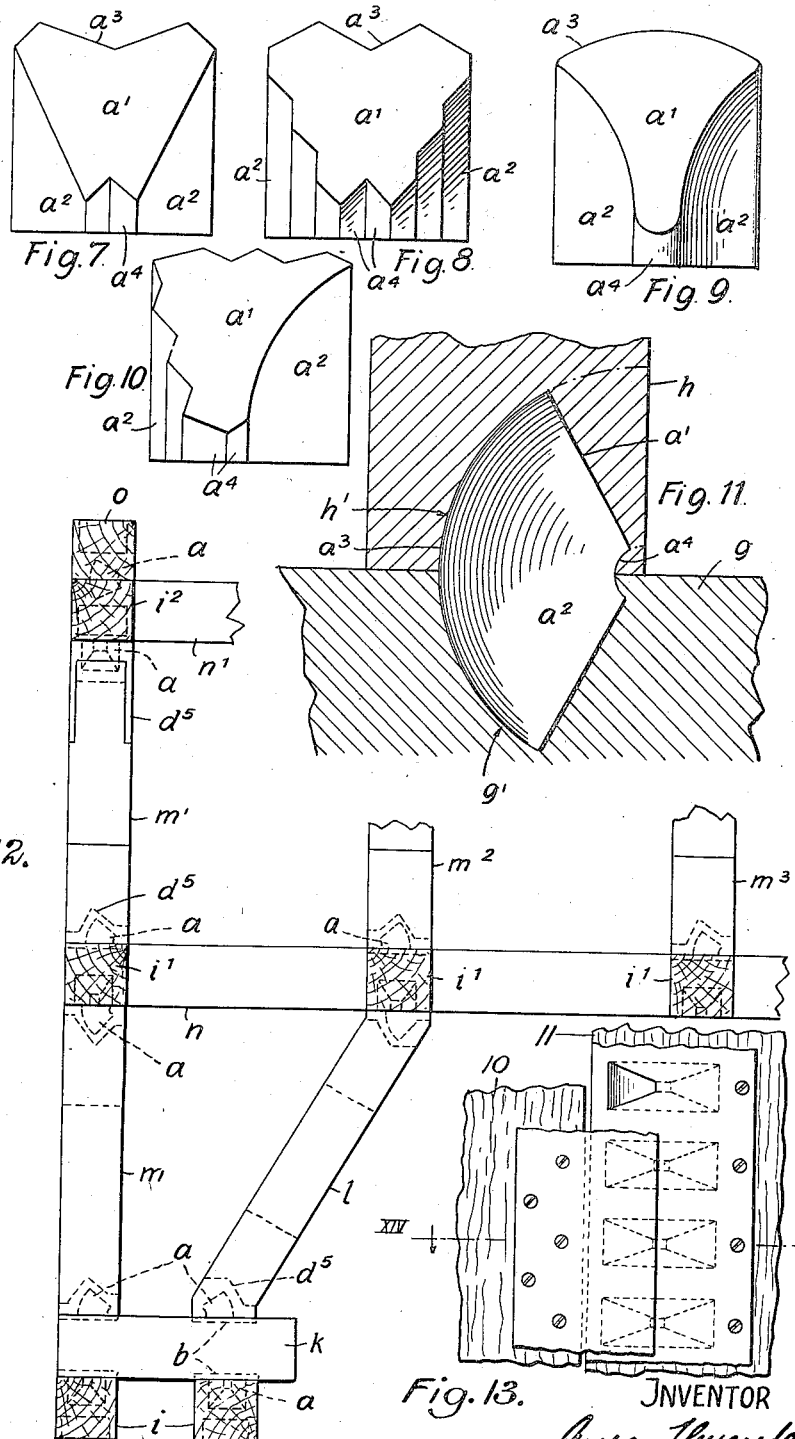

Patented May 9, 1939

2,157,986

UNITED STATES PATENT OFFICE 2,157,986

ARRANGEMENT FOR CONNECTING STRUCTURAL ELEMENTS

Georg Hossenfelder, Berlin, Germany

Application May 13, 1936, Serial No. 79,605
In Germany May 13, 1935

12 Claims. (Cl. 20—92)

This invention relates to certain new and useful improvements in an arrangement for connecting structural elements, and especially for connecting building and constructional elements, and consists of two connecting bodies slidable one within the other by mutual rotary movement. The known arrangements of this type are constructed after the manner of hook-connections in which the load is only taken up by the inner part of the hook, so that the hook-connection secures the parts to be connected only against movements perpendicularly directed to the supporting surface, whereas it allows movements parallel to this surface. Consequently the known arrangements cannot be employed especially for a bridge- or building construction; the connection does not possess sufficient rigidity because the lateral surfaces are not utilized to assist in supporting.

According to the invention an arrangement is produced which is excellently suitable as building and constructional element and also rigidly resisting relative to lateral stresses, in that the two connecting bodies are produced by turning their cross-sectional faces having lateral edges as generating surface about an axis, said axis forming at least with one of the two lateral edges an angle which is smaller than a right angle in one of the bodies and larger by the same amount than a right angle in the other body. In this manner the lateral edge situated beside the smaller angle in the one connection body forms a receding cone segment surface, and the lateral edge adjacent the larger angle in the other body forms a projecting cone segment surface fitting in this receding surface. By slipping the projecting cone surface into the receding surface by means of a stirring movement about the generating axis, the two connecting bodies are brought together so that the projecting surface now passes behind the recessed portion of the receding surface and thus produces in all directions the rigidity of the connection by the side surfaces of the connecting bodies. The arrangement is therefore particularly suitable as wood connection in roof-framework and carpentry structures, as iron connection in iron structures, also in bridge building, as stone connection and the like. The connection is also suitable for producing a reliable, easily detachable connection, if necessary between different kinds of material and particularly for building collapsible bridges, wooden houses, barracks, boxes, cupboards and other pieces of furniture. The connection can be advantageously employed for any structure wherever it is necessary to repeatedly and rapidly reassemble a construction without affecting the stability of the construction. In the case of structures which are not to be disassembled the invention can be applied wherever it is necessary to erect on a distant site parts produced in a workshop and to save cost of erection on the site. This connection may also be employed for fitting together very small apparatus, for toys, for the known mechanical building sets and the like, and on the other hand to join particularly large castings by these connecting bodies.

In practice the two lateral faces of both connection bodies are preferably parts of cone surfaces; the generating cross-section surface can moreover during its turning movement at the same time be displaced parallel to its pivot axis. A suitable shape for the generating surface is for example a trapezium. The boundary lines of the generating surface may be entirely or partly bent or curved. If recesses provided with at least one cone segment surface are worked into two connecting bodies or in two bodies to be connected, the connection of the two recesses may be effected by constructing a filling element with corresponding conical surfaces as an independent connection element and slipping this filling element into the two recesses. To enable this filling element to be slipped into position after the two bodies to be connected are placed one against the other, it is advisable to give access to the recesses from the outer side, for example by extending them up to the outer wall. The connection bodies may be arranged each on a plate, a connecting shoe or the like, by which they are each fixed on one of the articles to be connected. A plurality of connection bodies and of corresponding guide bodies may be mounted on oscillatable bands, rails or the like, so that by swinging out the two bands all connection bodies can be united or separated. When employing the connecting bodies on building structures, bridges or the like, it is advisable to mutually arrange the axes of rotation of the connection bodies so that adjacent constructional elements can be disassembled only by being turned in opposite directions of rotation.

Several embodiments of the invention are illustrated by way of example in the accompanying drawings, in which:

Fig. 1 shows in perspective view a connecting body fixed on a plate and having cone segment surfaces.

Fig. 1a is a side elevational view of the connecting body shown in Fig. 1.

Fig. 2 is a top plan view of Fig. 1.

Fig. 3 is a front elevation seen from the generating and pivot axis of the connecting body.

Figs. 4 to 6 show in vertical section, in horizontal section on line V—V of Fig. 4 and in end elevation, respectively, the second connecting body constructed as counter- or lining piece with projecting cone segment surfaces and designed to receive the first connecting body.

Figs. 7 to 10 are elevational views of the connecting body with differently shaped boundary lines.

Fig. 11 shows in section the two wood blocks, the surfaces of which are lying the one upon the other, said blocks being connected by a connecting body constructed as independent connecting element.

Fig. 12 shows a portion of a bridge partly in elevation and partly in cross section.

Figure 13 is a fragmentary plan view showing a plurality of wedges arranged on bands, and Figure 14 is a cross sectional view taken on line 14—14 of Figure 13.

A connecting body $a$, having for example the shape illustrated in side elevation in Fig. 1a, is placed on a plate $b$, which is fixed on a beam or the like with the aid of bolts $c$ (Fig. 3) in the counter plates $d^5$ having recesses $e$ or the like for accommodating the bolt heads. The connecting body $a$ and the plate $b$ are preferably made in one piece. The connecting body may, however, also be made separately or it may be rigidly connected with the parts to be connected; it can also be arranged on the head end of a beam or on any other article. The connecting body $a$ is here produced from a trapezium-shaped surface $a'$ which is turned about an axis corresponding with the front edge of the plate $b$ or with a parallel line thereof. The two side surfaces $a^2$ extend symmetrically, according to the drawings, and form cone segment surfaces, whereas the outer surfaces $a^3$ and the inner surface $a^4$ are cylinder segment surfaces.

Figs. 2 and 3 show how the connecting body bordered by the outer surface $a^2$, the lateral surfaces $a^2$ and the generating surface $a^1$ tapers to the small cylinder segment surface $a^4$. A recess $d$ corresponding to this tapered shape is formed in the connecting body (Figs. 4 to 6) forming the counter piece, so that its surface $d^3$ corresponds to the cylinder segment surface $a^3$, and its surface $d^4$ to the cylinder segment surface $a^4$, whereas the lateral surfaces $d^2$ correspond to the cone segment surfaces $a^2$. The cross section or the aperture $d^1$ of the counter piece corresponds to the trapezium-shaped cross section $a^1$ of the connecting body $a$. The connection is established by turning the two connecting bodies one in the other in order to obtain a common generating axis. This connection is rigid in all directions as the lateral interengaging cone segment surfaces form the supporting surfaces. By swinging one part about the axis of the cylindrical surfaces $a^3$, $d^3$ or $a^4$, $d^4$, which in this instance are also the cone axis, the two parts can be separated without difficulty.

The side edges of the cross-section surface form with the generating or turning axis an angle which is greater or smaller than 90°. In Fig. 3 the angle $x$ formed between the side edge R—R and the axis P—P is smaller than 90°; in Fig. 6 the angle $y$ formed between the side edge T—T and the axis S—S is greater than 90° by the same value. The receding cone segment surface $a^2$ is formed beside the small angle $x$ and the projecting cone segment surface $d^2$ corresponding to the receding surface is formed beside the angle $y$.

The bordering lines of the generating surfaces can be entirely or partly bent or curved, as shown, for example in Figs. 7 to 10.

The recess $d$ can be worked in the article to be connected.

Fig. 11 shows the connection of two such parts $g$ and $h$ by a filling body $a^2$ constructed as independent connecting element. This filling body may have the same shape as the connecting body shown in Fig. 1 or one of the sectional shapes shown in Figs. 7 to 10. The two articles $g$ and $h$ to be connected have recesses $g^1$ and $h^1$ which correspond in shape to the shape of the filling body. If the two parts are to be connected, the filling body or wedge can first be partly introduced into the part $g$, whereupon the other beam or part $h$ is applied and the two parts are connected by turning with the wedge. The filling body may drop into the locking position by being slipped into one beam through an aperture of corresponding cross-sectional shape (shown in dotted lines), the aperture being subsequently closed. In this manner two beams or articles can be connected by the filling body without it being possible to again separate them by any other than a turning movement. In particular it is impossible to pull asunder the two parts by a pull directed perpendicularly to their contacting surface; they are also rigidly connected in all other directions. If the filling body is inserted into the guide from the exterior, it must, if the parts $g$ and $h$ cannot be oscillated, be turned out along the same path by means of a tool.

In the form of construction shown in Fig. 12, a portion of a collapsible bridge is shown as possibility of application, the sills $i$ carry the saddle beams $k$, on which the trusses $m$, $l$ are built. The connection of the sills $i$ with the saddle beams $k$ and of these with the trusses $m$, $l$ is effected in the manner illustrated by the connecting bodies $a$ and shoes $d^5$, the plates of which are fixed on the saddle beams.

In a similar manner the woodwork parts of the bridge proper, comprising the lower booms $n$ and upper booms $n^1$ are connected with the transverse connections $i^1$, $i^2$ and with the trusses by means of connecting bodies.

The drawings show how these parts can be quickly fitted together by single turning with the aid of connecting bodies and are then rigidly mutually stayed with joints which resist bending. The connection between the lower boom $n$ and upper boom $n^1$ is effected by posts $m^1$, $m^2$, $m^3$ etc., which are preferably inserted with alternating direction of rotation, so that each newly inserted part locks the preceding part.

It is not necessary to make plane one or both end faces $a^1$ of the connecting bodies $a$, they may be of any desired shape, for example protrude convexly in outward direction. Thus, the introduction of the connecting body is facilitated. By this constructional means, especially when the connecting body is made so that it loosely fits on the wide edge and gradually more accurately towards the point, the swinging in of a series of connecting bodies lying the one at the side of the other on a long band is facilitated.

The connecting and filling bodies can be made in any size. It is therefore possible to standardize them and make them as mass articles to be stocked in sets according to size, as is usual for example in the case of nails, screws and bolts.

As shown in Figs. 13 and 14, these wedges may be arranged side by side on bands 10 and 11 in a shape similar to that described or in shapes deviating therefrom, for example in narrow oblique shapes on bands, and successively connected by corresponding guides or wedge grooves by turning. They then produce an effective and reliable connection which can only be disengaged by turning the bands in one direction.

I claim:

1. An arrangement of the character described for connecting structural elements comprising two connecting bodies adapted to be slipped one within the other by mutual turning movement, the two connecting bodies being produced by turning their cross sectional surface having two side edges as generating surface about an axis forming with at least one of the two side edges an angle which is smaller than a right angle in the one connecting body and greater than a right angle by the same amount in the other connecting body, so that in the one connecting body the side edge at the side of the smaller angle produces a receding cone segment surface and in the other connecting body the side edge at the side of the larger angle forms a protruding cone segment surface corresponding to the receding surface, said protruding surface adapted to slidably engage said receding surface by means of a mutual turning movement between the two bodies about the generating axis to establish the connection.

2. An arrangement as specified in claim 1, in which both lateral faces of the connecting bodies are cone segment surfaces.

3. An arrangement as specified in claim 1, in which the generating surface is a trapezium.

4. An arrangement as specified in claim 1, in which the generating surface is a trapezium and the boundary lines of the generating surface are at least partly stepped.

5. An arrangement as specified in claim 1, in which the generating surface is a trapezium and the boundary lines of the generating surface are at least partly curved.

6. An arrangement as specified in claim 1, comprising two hollow spaces having each at least one cone segment surface and worked in two connecting bodies or in two bodies to be connected, and a separate filling body having a corresponding cone segment surface engaging in said two bodies.

7. An arrangement as specified in claim 1, comprising two hollow spaces having each at least one cone segment surface and worked in two connecting bodies or in two bodies to be connected, and a separate filling body having a corresponding cone segment surface engaging in said two bodies, the hollow spaces being accessible from the outer side.

8. An arrangement as specified in claim 1, in which the connecting bodies are each mounted on a plate by which they are each secured to one of the articles to be connected.

9. An arrangement as specified in claim 1, in which the connecting bodies are each mounted on a shoe by which they are each secured to one of the articles to be connected.

10. An arrangement as specified in claim 1, in which a plurality of similar connecting bodies are arranged on a band and a corresponding number of corresponding counter connecting bodies are mounted on another band, the two bands being mutually oscillatable to engage and disengage said connecting bodies.

11. An arrangement as specified in claim 1, in which a plurality of similar connecting bodies are arranged on a bar and a corresponding number of corresponding counter connecting bodies are mounted on another bar, the two bars being mutually oscillatable to engage and disengage said connecting bodies.

12. An arrangement as specified in claim 1, in which the axes of rotation of the connecting bodies are mutually arranged so that neighbouring connecting bodies are engaged and disengaged by turning in opposite directions.

GEORG HOSSENFELDER.